United States Patent
Paul et al.

(10) Patent No.: US 7,253,594 B2
(45) Date of Patent: Aug. 7, 2007

(54) REDUCING POWER/AREA REQUIREMENTS TO SUPPORT SLEEP MODE OPERATION WHEN REGULATORS ARE TURNED OFF

(75) Inventors: Somshubhra Paul, Bangalore (IN); Bhaskar Ramachandran, Bangalore (IN); Srinivasan Venkataraman, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 86 days.

(21) Appl. No.: 10/905,737

(22) Filed: Jan. 19, 2005

(65) Prior Publication Data

US 2006/0161792 A1    Jul. 20, 2006

(51) Int. Cl.
  *G05F 1/44*    (2006.01)
(52) U.S. Cl. .................. 323/268; 323/224; 363/65; 363/25
(58) Field of Classification Search ............ 363/15–17, 363/89, 84, 74–78, 81, 65–69; 323/268, 323/271, 282–285, 224, 259
  See application file for complete search history.

(56) References Cited

U.S. PATENT DOCUMENTS 5,481,178 A * 1/1996 Wilcox et al. .............. 323/287
5,528,480 A * 6/1996 Kikinis et al. ................ 363/15
6,674,274 B2 * 1/2004 Hobrecht et al. ........... 323/285
2003/0211870 A1   11/2003 Jiguet et al.

OTHER PUBLICATIONS

"DC—DC Converter Basics", Power Electronics: Converters, Applications and Design, by G. Ledwich, downloaded fromwww.powerdesigners.com/InfoWeb/design_center/articles/DC-DC/converter.shtm, pp. 1-12, 1998.
"Input and Output Noise in Buck Converters Explained", download from www.maxim-ic.com/tarticle/view_article.cfm/article_id/986, pp. 1-15, Feb. 28, 2002.

* cited by examiner

*Primary Examiner*—Rajnikant B. Patel
(74) *Attorney, Agent, or Firm*—Steven A. Shaw; W. James Brady; Frederick J. Telecky, Jr.

(57) ABSTRACT

A single sleep mode controller which ensures that there is at least a corresponding minimum voltage level across capacitors when the corresponding regulators are turned off. In an embodiment, the sleep mode controller uses a single comparator which compares the voltages across capacitors in a time division multiplexed (TDM) manner, and initiates the charging operation for the capacitor if the voltage level falls below a corresponding minimum voltage level. The sleep mode controller continues the charging operation until the voltage level exceeds a corresponding upper threshold value. Due to the use of the single controller, power and/or space savings may be attained.

8 Claims, 6 Drawing Sheets

REDUCING POWER/AREA REQUIREMENTS TO SUPPORT SLEEP MODE OPERATION WHEN REGULATORS ARE TURNED OFF

BACKGROUND OF THE INVENTION

1. Field of the Invention

The present invention relates to the field of design of electronic circuits, and more specifically to a method and apparatus for reducing power/area requirements to support sleep mode operation when regulators are turned off.

2. Related Art

Regulators generally refer to components which provide constant voltage or current signals ("constant signal") to other components of a system. The constant voltage or current signals are generally required as input signals for the operation of such other components.

There is a general need to reduce the power consumption requirements in systems. One technique often employed is to make inactive (or disable) the components, which are not required to be operational in the corresponding time durations. At least some of the inactive components are powered down, and the system (or a portion) containing the components is said to be in the 'sleep mode'.

Another technique employed in conjunction with placing the components in sleep mode, is to turn off the regulators providing the constant signals to the components in sleep mode. By turning off the regulators, the power consumption is further reduced.

One known problem with turning off the regulators is that it may take unacceptably long time to provide the desired constant signal again, soon after it is determined to activate (or bring out of sleep mode) the corresponding components.

One source of such a long time is the presence of a capacitor, generally used to filter any transients in the constant signal, before being provided to the components. The capacitor would need to be charged before the desired level of the signal is provided as input to the components, and the charging may take long duration due to the large capacitor size typically used.

Accordingly, a prior embodiment uses circuits, with each circuit being associated with a corresponding regulator/capacitor combination to maintain the voltage across the corresponding capacitor at a desired level. As a result, the constant signal can be provided soon after it is determined to activate the corresponding components.

One problem with such an approach is that the power and area requirements of the corresponding implementations may be unacceptably high due to the use of such multiple circuits to maintain the voltage levels. Accordingly, what is required is a method and apparatus which reduces power and/or area requirements to support sleep mode operation when regulators are turned off.

BRIEF DESCRIPTION OF THE DRAWINGS

The present invention will be described with reference to the following accompanying drawings.

FIG. (FIG.) 1 is a block diagram of a prior embodiment containing multiple sleep mode amplifiers, with each sleep mode amplifier being associated with a corresponding regulator/capacitor combination to maintain the voltage across the corresponding capacitor at a desired level.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A system provided according to an aspect of the present invention contains a sleep mode controller, which maintains the voltage level across multiple capacitors at corresponding desired levels when the regulators are turned off. Due to the use of a shared sleep mode controller, the area and/or power requirements are reduced.

In an embodiment described below, the sleep mode controller maintains voltage levels across multiple capacitors by charging each capacitor over a short duration (charging duration) until the voltage on the capacitor is adequate. The voltage across each capacitor is sampled at a regular interval ("sampling interval"), and the sleep mode controller starts or terminates charging each capacitor based on the corresponding sampled value. The total charging duration of each capacitor is determined by a threshold strength above which the voltage level is to be maintained and the charging current strength. The charging duration may be designed to equal a multiple of the sampling interval.

Various aspects of the present invention will be clearer in comparison to a prior system in which several features of the present invention are not implemented. Accordingly, the details of such a prior system are described below first.

2. Example Prior System

Figure 1:
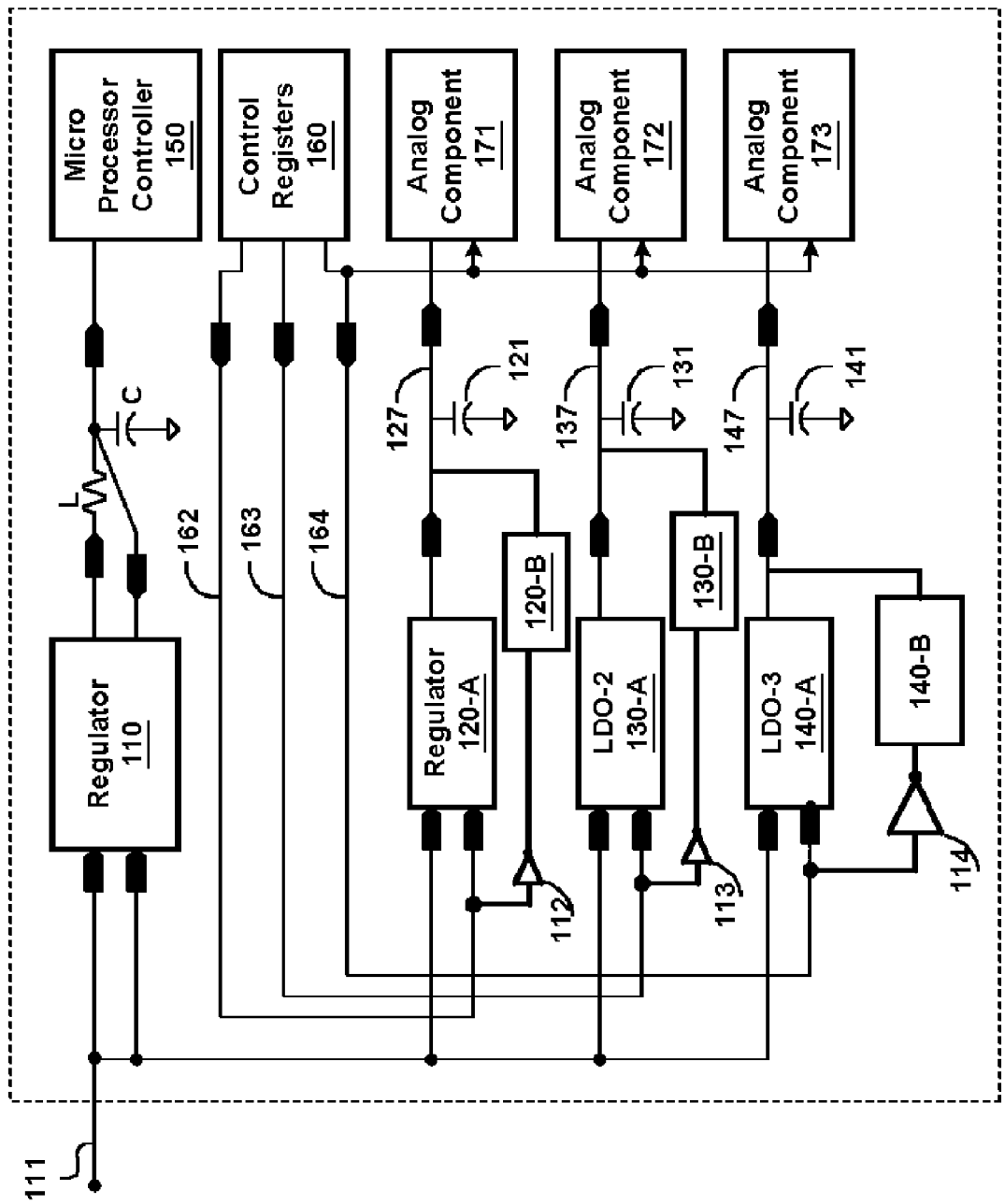

FIG. 1 is a block diagram illustrating the details of a prior system. The system there is shown containing regulators 110, 120-A, 130-A and 140-A, micro-processor controller 150, control register 160, analog components 171-173, capacitors 121, 131, and 141, inverters 112-114, and sleep amplifiers 120-B, 130-B and 140-B. Each component is described below in further detail.

Power supply is received on path 111, and is provided as an input to regulators 110, 120-A, 130-A and 140-A and sleep amplifiers 120-B, 130-B and 140-B. Regulator 110 generates a constant voltage for the operation of micro-processor controller 150. As micro-processor controller 150 does not go into sleep mode in this embodiment, additional circuitry supporting sleep mode is not shown/described. In one prior approach, micro-processor controller 150 operates of a lower speed clock signal, and thus requires continuous power supply, thereby consuming power in sleep mode.

Control registers 160 (which may be set by micro-processor controller 150) indicate the specific one(s) of analog components 171-173 on corresponding control lines 162-164, which are to be in sleep mode (or active mode).

Regulators 120-A, 130-A and 140-A respectively provide a corresponding constant voltage signal to analog components 171, 172, and 173, when the corresponding control signal represents an active mode. In an embodiment, each regulator is implemented as a low-drop-out (LDO) regulator, well known in the relevant arts.

Sleep mode amplifiers 120-B, 130-B and 140-B respectively maintain a corresponding desired voltage across capacitors 121, 131 and 141 when the corresponding control signal represents a sleep mode (and received via the corresponding inverter 112-114). Due to the presence of such desired voltage level across the capacitors, analog components 171-173 can be quickly operational soon after the corresponding signal 162-164 indicates active mode.

However, one problem with such an approach is that the presence of multiple sleep mode amplifiers may consume unacceptably high power and/or area. Various aspects of the present invention overcome one or more of such disadvantages, as described below in further detail.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

3. Invention

Figure 2:
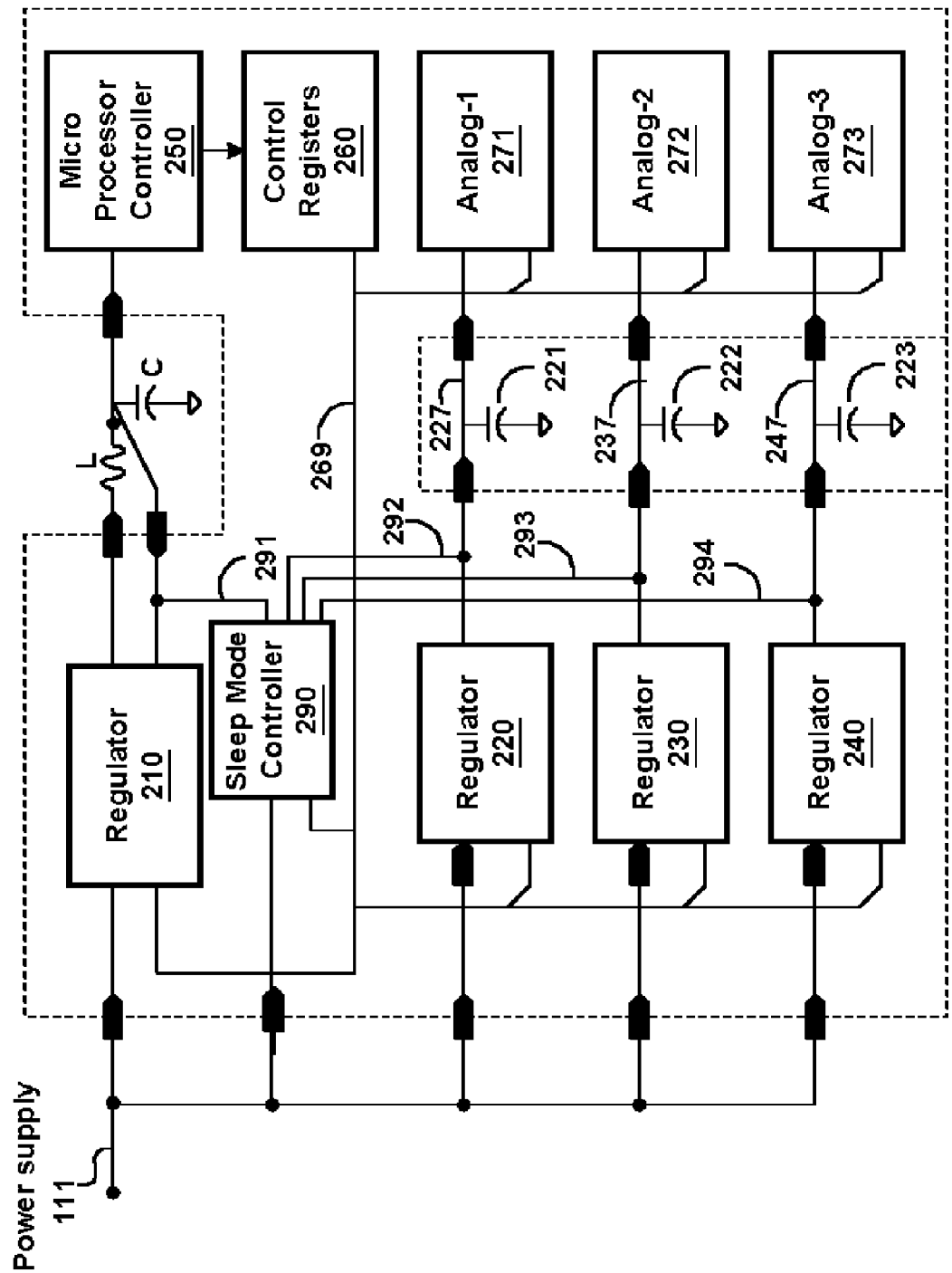
FIG. 2 is a block diagram illustrating the details of an example system provided according to an aspect of the present invention.

FIG. 2 is a block diagram illustrating the details of an example system implemented according to various aspects of the present invention. The system there is shown containing regulators 210, 220, 230 and 240, micro-processor controller 250, control register 260, components 271-273, capacitors 221-223, and sleep mode controller 290. Each component is described below in further detail.

Regulators 210, 220, 230 and 240, micro-processor controller 250, and control register 260 respectively operate similar to regulators 110-A, 120-A, 130-A and 140-A, micro-processor controller 150, and control register 160, (except that some of the differences are described below) and the corresponding description is not repeated here in the interest of conciseness.

Components 271-273 may be implemented using analog and/or digital sub-components. Some of the components may require some power even during sleep mode operation, for example, to maintain pre-sleep status information and to detect events upon which the active mode has to be resumed.

Sleep mode controller 290 maintains the voltage level across each capacitor 221-223 in a desired range when the corresponding regulators 210, 220, 230 and 240 are turned off (due to the sleep mode signals received on path 269). Sleep mode controller 290 ensures that sufficient charge is present on capacitors 221-223 to provide any necessary power required in the sleep mode operation of analog components 271-273.

Since sleep mode controller 290 maintains sufficient charge on capacitors 221-223, the corresponding regulators 220, 230 can be turned off in sleep mode. Similarly, regulator 210 can also be turned off since the charge across the capacitor (C, connected to path 291) associated with microprocessor controller 250 is also maintained by sleep mode controller 290. As a result, power consumption is reduced.

In addition, due to the use of a single sleep mode controller, savings in area and power consumption can be attained. The details of implementation and operation of an embodiment of sleep mode controller 290 is described below in further detail. First, the principle of operation of the embodiment is described.

4. Principle

Figure 3:
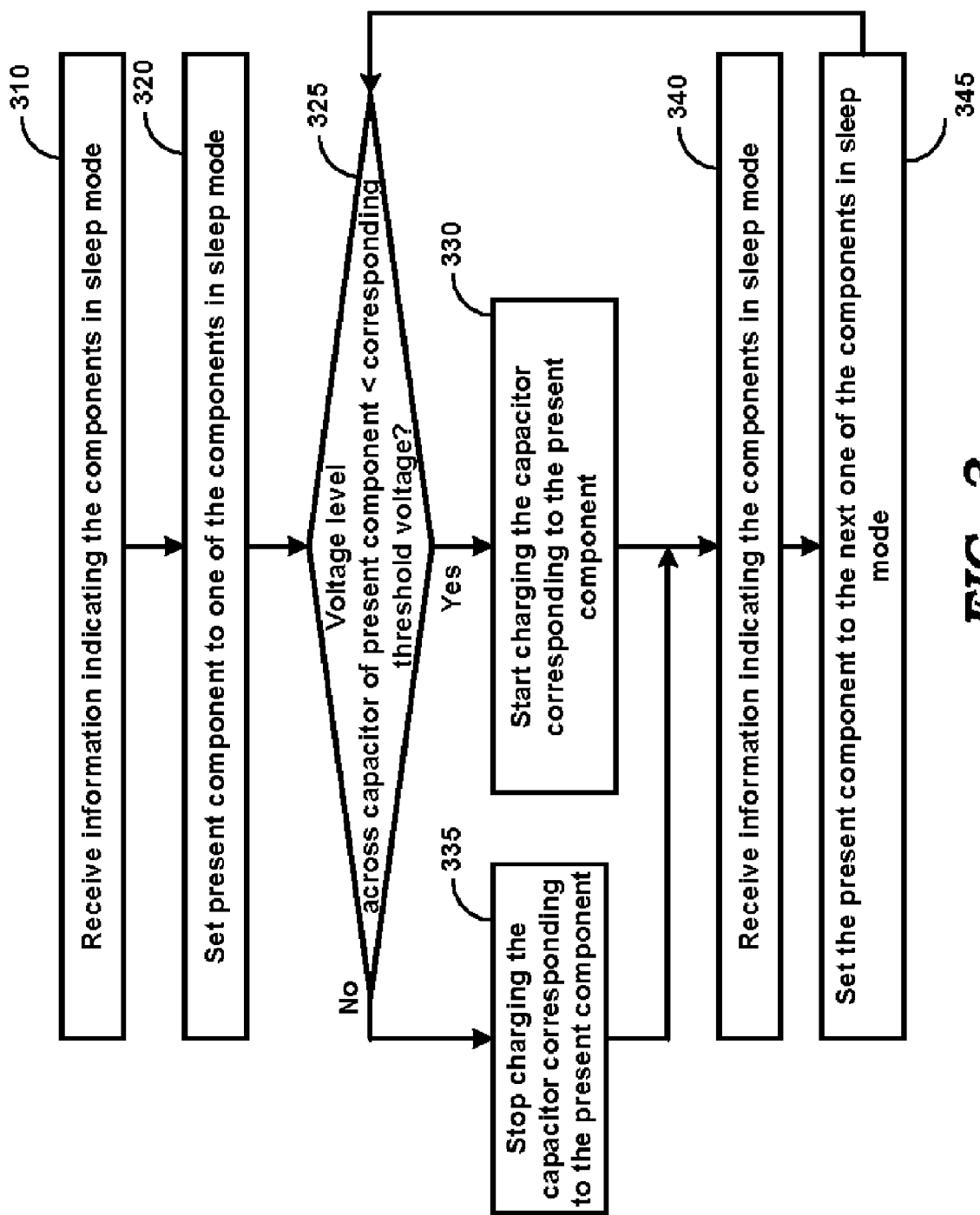
FIG. 3 is a flow chart summarizing the operation of a sleep mode controller provided according to an aspect of the present invention.

FIG. 3 is a flowchart illustrating the principle of operation of sleep mode controller 290 in one embodiment. The flowchart begins in step 301, in which control immediately passes to step 310. Even though the flowchart is described with reference to FIG. 2 for illustration, it should be understood that the flowchart can be implemented in other environments as well.

In step 310, sleep mode controller 290 receives information indicating the components in sleep mode. The information may be received from control register 260. In step 320, sleep mode controller 290 sets a present component to one of the components in sleep mode. The list of components in sleep mode is determined based on the information received in step 310.

In step 325, sleep mode controller 290 compares the voltage level across capacitor of present component with a corresponding threshold voltage. For example, assuming that component 272 is set to be the present component, the voltage level across capacitor 222 is compared with the corresponding threshold voltage. Control passes to step 330 if the voltage level is less than the threshold voltage, and to step 335 otherwise.

In step 330, sleep mode controller 290 starts charging the capacitor corresponding to the present component. The charging may be performed by injecting current into the capacitor. Control then passes to step 340 while the charging continues (i.e., without being blocked until completion of charging).

In step 335, sleep mode controller 290, terminates charging the capacitor corresponding to the present component. Thus, injecting current may be stopped. Control then passes to step 340.

In step 340, sleep mode controller 290 receives information indicating the components in sleep mode. It may be appreciated that the list of components in sleep mode can change as the state of the components changes (from sleep mode to active mode or vice versa).

In step 345, sleep mode controller 290 sets the present component to the next one of the components in sleep mode. In an embodiment, a circuit logically maintains an ordered list of the components in sleep mode, and selects the next component in the list as the present component. Control then passes to step 325.

The loop of steps 325 to 345 is thus repeated for each capacitor. It may also be appreciated that the voltage level is compared for the capacitors in a time division multiplexed (TDM) manner enabling usage of shared components, thereby reducing the area and power requirements.

Various embodiments can be implemented based on the principles and description provided above. The description is continued (FIG. 4) with respect to a portion of sleep mode controller 290 in relation to capacitor 221. The portions related to the other capacitors is also included then with respect to FIG. 5.

5. Sleep Mode Controller

Figure 4:
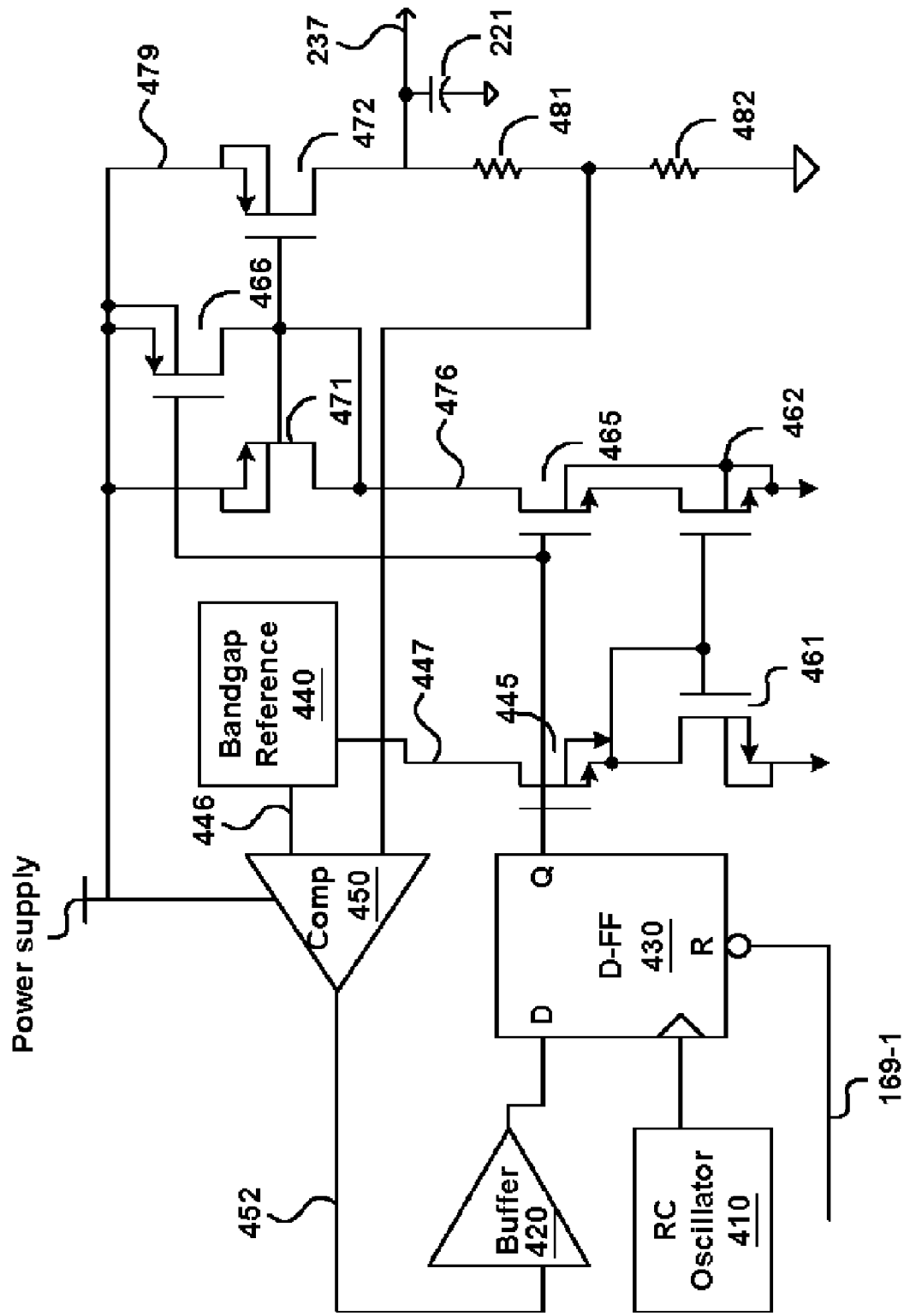
FIG. 4 is a block diagram illustrating the principle underlying the implementation of a sleep mode controller provided according to an aspect of the present invention.

FIG. 4 is a block diagram illustrating the principle underlying the implementation of a sleep mode controller according to an aspect of the present invention. The block diagram is shown containing bandgap reference 440, comparator 450, D-Flip-flop 430, buffer 420, oscillator 410, transistors 461, 462, 465, 466, 445, 471 and 472, resistors 481 and 482, and capacitor 221. Each component is described below in further detail.

Bandgap reference 440 provides a reference voltage Vref on path 446 and reference current Iref on path 447. Charging current is set to an appropriate value (K times $I_{leakage}$, as described in sections below) depending on the total leakage current and sleep mode load current.

Comparator 450 compares Vref received on one of the input terminal (+) and a feedback voltage received on another terminal, and generates a comparison result on path 452. A bit value of 1 indicates that capacitor 221 is to be charged, and 0 indicates that no charging is required in the present cycle. The feedback voltage is adjusted to an appropriate value by proper choice of resistance values for resistors 481 and 482 (operating as a voltage divider) such that a desired voltage is maintained across capacitor 221 for sleep mode operation.

Buffer 420 presents a digital bit generated by comparator to the input of the D-flipflop by providing necessary interface. Oscillator 410 generates a reference clock with time period Tosc.

D-flipflop 430 receives on D-input terminal the digital bit generated by comparator 450, and receives on clock input a reference clock generated by oscillator 410. D-flipflop 430 latches bit value received on D-input to output terminal Q at every rising edge of the reference clock signal.

Transistors 461 and 462 operate to mirror current Iref on path 447 to path 476. Transistors 471 and 472 (with transistor 472 having k times the size of transistor 471) operate to mirror the current on path 476 to path 479. Each of transistors 445, 465 and 466 operates as a switch, which closes (makes contact) when the output of D-flipflop 430 is at logic '1' and opens (break contact) when the output of the D-flipflop is at logic '0'.

In operation, when the charge on (therefore voltage across) capacitor 221 falls below a threshold level (determined by Vref generated by bandgap reference 340 and the voltage received from resistor divider 481 and 482) due to leakage and sleep mode load currents, comparator 450 generates a logic value '1' which is provided as an input to D-flipflop 430. D-flipflop 330 latches logic level '1' to output Q at the immediate occurrence of rising edge of the clock signal. As a result, switches 445, 465 and 466 close, allowing current mirror action. Hence a charging current derived from Iref charges capacitor 221. The manner in which the charging action stops, is described below.

Charging of the capacitor 221 results in increase in voltage across capacitor 221, thereby generating logic level '0' at the comparator output. As noted above, the strength of charging current (Ichg, which is proportionate to Iref) is chosen such that increase (to generate 0) of voltage is completed within a single (or multiple, as desired) clock cycle. The rising edge occurring immediately after the generation of logic '0', causes the 0 to be propagated to the output Q of D-flipflop 430. As a result transistors 465 and 466 break contact thereby terminating charging of capacitor 221.

The description is continued with respect to the manner in which sleep mode controller 290 can be implemented to operate with all the three capacitors 221-223.

6. Detailed Implementation

Figure 5:
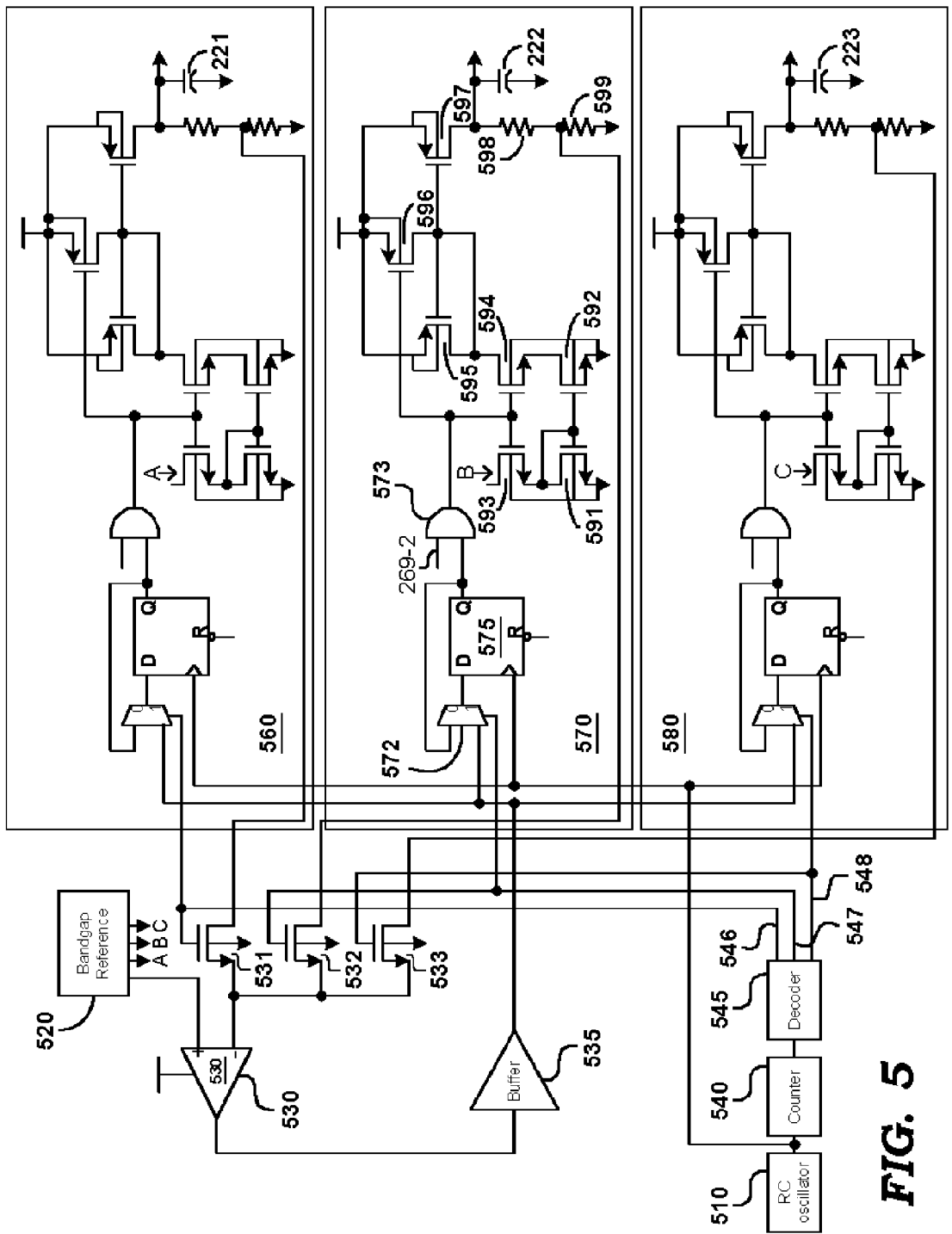
FIG. 5 is a block diagram illustrating the details of implementation of a sleep mode controller in an embodiment of the present invention.

FIG. 5 is a block diagram illustrating the details of implementation of sleep mode controller 290 in one embodiment. The diagram is shown containing three portions 560, 570 and 580, in addition to bandgap reference 520, comparator 530, buffer 535, oscillator 510, counter 540, decoder 545, and transistors 531-533. Each component is described below in further detail.

It should be understood that portions 560, 570 and 580 are implemented similarly, and correspond to voltage regulation of capacitors 221, 222 and 223 respectively. On the details of portion 570 is provided in the interest of conciseness. Other portions are described similarly. In addition, the detail of portion 570 is described in comparison to FIG. 4, also for conciseness.

Portion 570 is shown containing multiplexer 572, D flip-flop 575, AND gate 573, transistors 591-597, resistors 598 and 599, and capacitor 222. Transistors 591-597, resistors 598 and 599, and capacitor 222 operate similar to transistors 445, 461, 462, 465, 471, 472, and 466, resistors 481 and 482, and capacitor 221 respectively, however, the operation of the components is enabled/disabled based on the output of AND gate 573 (compared to D-flip-flop), as described below.

Resistor divider network containing resistors 598 and 599 operates to provide a desired fraction of voltage across capacitor 222 to the drain terminal of transistor 532. The relative resistance values of the two resistors are chosen to enable all the three portions 560, 570 and 580 to share the same comparator 530.

Bandgap reference 520 is shown generating three reference currents for the three portions 560, 570 and 580, and a voltage reference provided to the + terminal of comparator 530. The three reference currents are equal but the current mirror implementation of Iref to Ichg in portions 560, 570 (by controlling transistor 593) and 580 can be unequal depending on the charging requirements of the corresponding capacitor. Oscillator 510 provides a clock signal, which drives the clock inputs of various flip-flops.

Counter 540 and decoder 545 operate to enable one of three paths 546-548 (and disable other two) in a round-robin fashion in the clock cycles of the clock signal. Thus, only one of the three paths 546-548 is enabled and the other two are disabled in each clock cycle.

Transistors 531-533 are respectively enabled by enable paths 546-548, and (the drain terminal) are respectively connected to the resistor divider (e.g., 598 and 599) from the three portions 560, 570 and 580. Thus, the portion of the voltage across one of the three capacitors, as determined by the enable paths, is provided as an input to comparator 530.

Comparator 530 compares the divided voltage received from one of transistors 531-533 with the reference voltage provided by bandgap reference 520, and the comparison result is provided as an input to multiplexer 572 via buffer 535. It may be appreciated that comparator 530 is shared for comparison by appropriate use of transistors 531-533.

Multiplexer 572 is controlled by the enable signal on path 547, and operates to forward the output of comparator 530 when the enable signal indicates that the present cycle corresponds to capacitor 222. The output of multiplexer 572 is connected as input to D flip-flop 575, the output of which is provided as an input to AND gate 573.

It should be appreciated that D flip-flop 575 latches the output of buffer 535 when capacitor 222 is selected in the present clock cycle, and the latched value is fed back to the D input in the remaining clock cycles. As a result, once initiated, the charging operation continues until the output of comparator 530 indicates that the voltage across capacitor 222 has reached a sufficient level in a subsequent iteration.

AND gate 573 performs a logical AND operation of 269-2 (containing in path 269 of FIG. 2, and indicating whether component 272 is in sleep or active states). It is assumed that path 269-2 contains a logic 1 to represent sleep mode. A logic 1 at the output of AND gate 573 causes charging of capacitor 222, and a 0 value disables the charging. Thus, the output of multiplexer 572 is propagated only if the corresponding component is in sleep mode.

While the description is provided with respect to capacitors and voltage levels, it should be understood that alternative embodiments can be implemented with a combination of inductor (another example of energy storage element) and current levels by reading the disclosure provided herein. The manner in which each capacitor is charged and discharged by sleep mode controller in an example embodiment is explained below with the help of a timing diagram.

7. Timing Diagram

Figure 6:
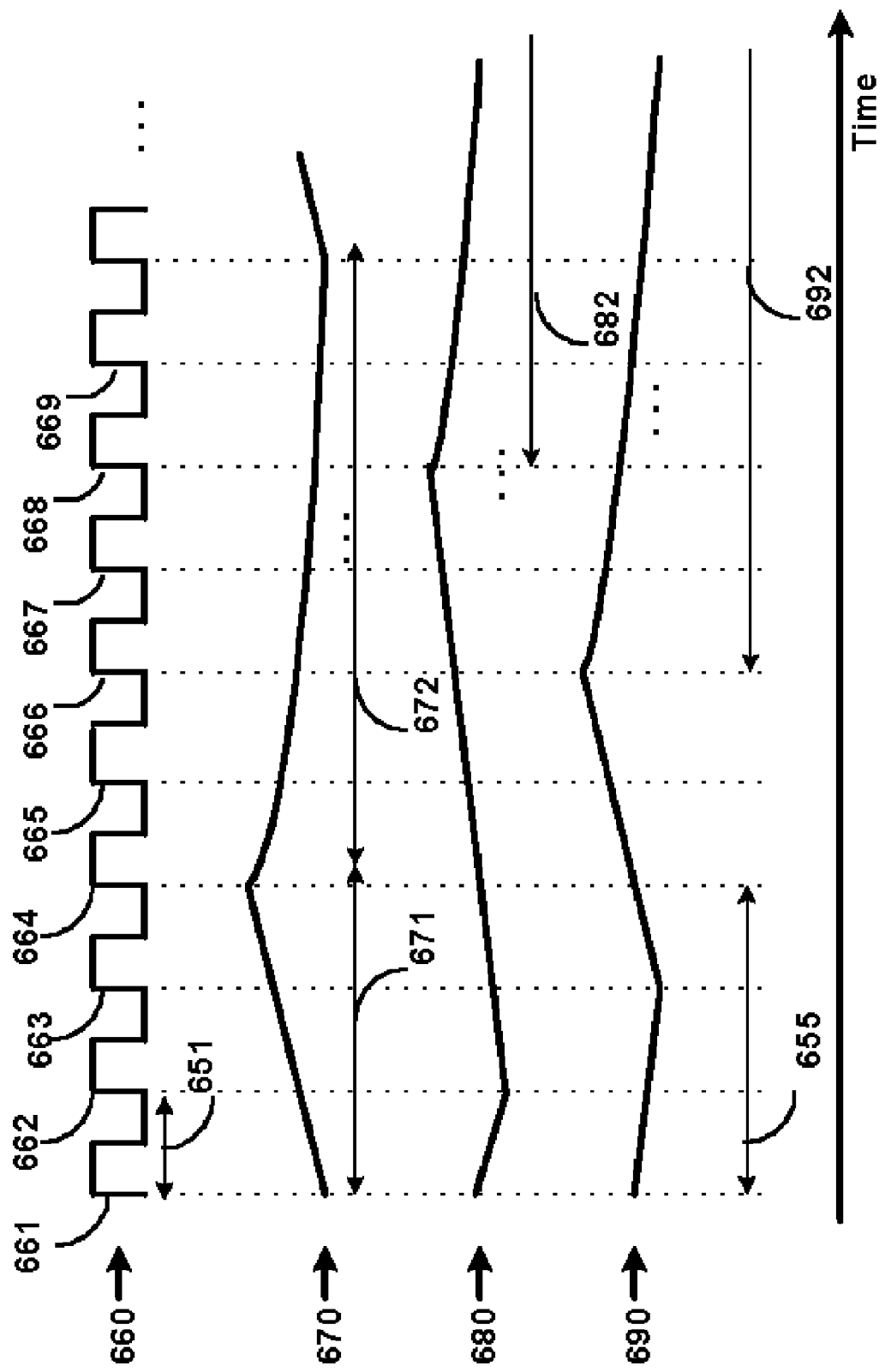
FIG. 6 is a timing diagram illustrating the operation of a sleep mode controller in one embodiment.

FIG. 6 is a timing diagram illustrating the operation of sleep mode controller 290 of FIG. 5. The timing diagram is shown containing reference clock signal 660, voltage levels 670, 680 and 690 (respectively corresponding to capacitors 221, 222 and 223). Each signal is described below in further detail.

Reference clock signal 660 is generated by RC oscillator 510, and is shown with rising edges 661-669. The clock period Tosc is shown as duration 651. Rising edges represent sampling instants. For illustration, it is assumed that counter 540 and decoder 545 operate to sample voltage across the capacitor 221 at time instances 661, 664 and 667, to sample voltage across capacitor 222 at time instances 662, 665 and 668, and to sample the voltage across capacitor 223 at time instances 663, 666, 669.

With respect to voltage signal 670, the signal is shown rising starting from time instance 661 assuming that the voltage level at the time instance is below a corresponding lower threshold (and capacitor 221 is being charged). From time instance 664, voltage signal 670 is shown falling assuming that the voltage level at the time instance exceeds a corresponding upper threshold (and charging of capacitor 221 is stopped, and the leakage current is causing the gradual discharge). As can be readily observed, capacitor 221 is continuously charged between time instances 661 and 664.

With respect to voltage signal 680, the first comparison occurs at time instance 662, and the voltage across capacitor 222 is shown rising assuming that comparator 560 generated a logic 1. The second comparison occurs at time instance 655 and rise of voltage signal 680 continues thereafter as well assuming that the voltage level at the time instance is below a corresponding upper threshold. However at the third comparison at time instance 668, the voltage level is assumed to exceed the upper threshold and thus charging of capacitor 222 is stopped at the time instance.

Voltage signal 690 is similarly described in that there is no charging up to first comparison point at time instance 663, and charging starts thereafter. Charging continues until time instance 666 (second comparison), and charging is stopped thereafter.

From above explanation it is apparent that voltage across each of the capacitor 221, 222 and 223 are sampled at regular interval. Typically the interval can be determined based on various parameters however in this example interval shown as 655 is set to a value equal to number of regulators 'n' (in this case 3) multiplied by a clock period 'Tosc' (in this case 651). Since charging current is greater than leakage current the capacitor voltage is maintained for longer time duration than that of charging duration. As result charging process corresponding to each of the capacitors 221, 222 and 223 are non operative for longer period of time as shown by segments 672, 682 and 692 respectively.

The manner in which time duration corresponding to charging 671 and discharging 672, and the current strength used to charge capacitor 221, can be determined is described below.

8. Computations

The computations are described with reference to FIGS. 5 and 6. It may be appreciated that the decrease in voltage across the capacitors is due to various leakage currents. In an embodiment, the leakage is due to load leakage current $I_{loadleak}$ (i.e., due to current drawn by component in sleep mode), resistor current $I_{resistor}$ (i.e., due to the current drawn by the resistor network used for sampling the capacitor voltage, as described below in FIG. 4). The total leakage current $I_{leakage}$ is given by:

$$I_{leakage} = I_{loadleak} + I_{resistor} \qquad \text{Equation (1)}$$

The negative swing $V_-$ (decrease in voltage) across capacitor 221 during the non_charging period (before the next sensing instance on capacitor 221) is given by:

$$\Delta V_- = \frac{I_{leakage} * n * T_{osc}}{C_{221}} \qquad \text{Equation (2)}$$

wherein Tosc is the time period of the oscillator (using which clock 660 is generated), * represents a multiplication operation, n represents the number of regulators (equals 1 in the case of FIG. 4, and equals 3 in the case of FIG. 5) and $C_{221}$ represents the capacitance of capacitor 221.

The charging current used by sleep mode controller 290 may be chosen to be k times $I_{leakage}$. The rise in the voltage across capacitor 221 due to the charging current (before the next sensing instance on that particular capacitor 221) is given by:

$$\Delta V_+ = \frac{k * I_{leakage} * n * T_{osc}}{C_{221}} \qquad \text{Equation (3)}$$

Under steady state condition:

$$\Delta V_+ = k * \Delta V_- \qquad \text{Equation (4)}$$

From Equation (4), it can be appreciated that there are k non_charging cycles/periods for every charging cycle. In addition, by using equations (2) and (3) one may fix some of the parameters and calculate the variable of interest. In many cases the absolute lowest and the highest voltages are of interest in the sleep mode, for example, to maintain the states and memory contents of digital circuits.

Thus, the maximum value of Tosc can be calculated while fixing the other parameters. For each of charging circuit 560, 570 and 580, K may be selected to be different and sufficiently large to ensure that capacitors 221-223 are respectively charged in a desired short duration.

Further, the charging duration (365 above) and the strength of the charging current should be selected such that the voltage across the capacitor does not exceed the reliable voltage limits, for which component 271 is designed/fabricated. Thus, using the approaches and principles described above, various embodiments of regulators can be implemented to provide several advantages noted above.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A system comprising:

a plurality of components;

a plurality of regulators, with each regulator providing a constant signal to a corresponding one of said plurality of components;

a plurality of energy storage elements, with each energy storage element being connected to a path connecting a corresponding pair of component and regulator; and a shared sleep mode controller maintaining the energy level across each of said energy storage elements if the corresponding regulator is turned off, wherein said sleep mode controller comprises a single comparator which compares energy across said energy storage elements with corresponding threshold levels sequentially in a non-overlapping manner, said shared sleep mode controller further comprising:

a bandgap reference generating a reference voltage and a reference current, said single comparator comparing said reference voltage with a voltage level present across one of said capacitors;

a flip-flop latching a result of comparison of said comparator; and a plurality of transistors operating to inject said reference current to one of said capacitors.

2. The system of claim 1, wherein each of said energy storage elements comprises a capacitor, and said energy level corresponds to a voltage level.

3. The system of claim 1, wherein said sleep mode controller comprises a decoder indicating the voltage level across which of said plurality of capacitors is to be compared at a present time, said comparator being designed to receive the voltage level across the capacitor indicated by said decoder.

4. The system of claim 3, wherein said sleep mode controller further comprises a plurality of AND gates corresponding to said plurality of capacitors, wherein each AND gate disables charging of a corresponding capacitor if the corresponding regulator is turned on.

5. A sleep mode controller maintaining a desired energy level across each of a plurality of energy storage elements, each of said plurality of energy storage elements providing energy to a corresponding one of a plurality of components in a sleep mode operation, wherein said reference generator comprises a bandgap reference generating a reference voltage and a reference current, said single comparator comparing said reference voltage with a voltage level present across one of said capacitors, said sleep mode controller comprising:

a reference generator generating a reference energy;

a single comparator comparing said reference energy with energy level on each of said plurality of energy storage elements sequentially in a non-overlapping manner; and a plurality of portions, each injecting energy to a corresponding one of said plurality of energy storage elements if said single comparator indicates that energy on the corresponding energy storage is below a corresponding threshold;

a flip-flop latching a result of comparison of said comparator; and a plurality of transistors operating to inject said reference current to one of said capacitors.

6. The sleep mode controller of claim 5, wherein each of said energy storage elements comprises a capacitor, and said energy level corresponds to a voltage level.

7. The sleep mode controller of claim 5, further comprises a decoder indicating the voltage level across which of said plurality of capacitors is to be compared at a present time, said comparator being designed to receive the voltage level across the capacitor indicated by said decoder.

8. The sleep mode controller of claim 7, wherein said sleep mode controller further comprises a plurality of AND gates corresponding to said plurality of capacitors, wherein each AND gate disables charging of a corresponding capacitor if the corresponding regulator is turned on.

* * * * *